United States Patent
Choi et al.

(10) Patent No.: US 9,067,783 B2
(45) Date of Patent: Jun. 30, 2015

(54) GRAPHENE-BASED PHOTODETECTOR INCLUDING COMPLEX TRANSPARENT ELECTRODE, METHOD OF MANUFACTURING THE SAME, AND DEVICE INCLUDING THE SAME

(75) Inventors: Jae-young Choi, Suwon-si (KR); Won-jong Yoo, Seoul (KR); Chang-ho Ra, Seoul (KR); Tian-zi Shen, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 6 days.

(21) Appl. No.: 13/613,279

(22) Filed: Sep. 13, 2012

(65) Prior Publication Data
US 2013/0126700 A1    May 23, 2013

(30) Foreign Application Priority Data

Nov. 21, 2011  (KR) .......................... 10-2011-0121729

(51) Int. Cl.
| | |
|---|---|
| *H01L 21/00* | (2006.01) |
| *G01J 1/42* | (2006.01) |
| *B05D 5/12* | (2006.01) |
| *B82Y 30/00* | (2011.01) |

(52) U.S. Cl.
CPC ... *B82Y 30/00* (2013.01); *G01J 1/42* (2013.01)

(58) Field of Classification Search
None
See application file for complete search history.

(56) References Cited

U.S. PATENT DOCUMENTS 8,053,782 B2 * 11/2011 Avouris et al. ................. 257/76
2011/0042650 A1    2/2011 Avouris et al.

FOREIGN PATENT DOCUMENTS

| KR | 19910007142 A | 4/1991 |
|---|---|---|
| KR | 1999-0060011 A | 7/1999 |
| KR | 1020070004589 A | 1/2007 |
| KR | 1020110041965 A | 4/2011 |
| KR | 1020110081683 A | 7/2011 |
| KR | 1020120127070 A | 11/2012 |

OTHER PUBLICATIONS

Xia, et al., Utrafast graphene photodetector, Cornell University Library, arXiv.org>cond-mat>arXiv:0912.4794, (Submitted on Dec. 24, 2009) http://arxiv.org/abs/0912.4794, Apr. 3, 2012.
Chiou, Yu-Zung, GaN Ultraviolet Photodetectors with Transparent Titanium Tungsten and Tungsten Electrodes, Journal of the Electrochemical Society, J. Electrochem. Soc., vol. 152, Issue 8, pp. G639-G642 (2005) (Published Jul. 8, 2005).
Khomyakov, et al., First-principles study of the interaction and charge transfer between graphene and metals, arXiv:0902.1203v1 [cond-mat.mtrl-sci] Feb. 8, 2009, pp. 1-12.
Mueller, et al., Graphene photodetectors for high-speed optical communications, Nature Photonics, vol. 4, May 2010, pp. 297-301.

* cited by examiner

*Primary Examiner* — Seahvosh Nikmanesh
(74) *Attorney, Agent, or Firm* — Cantor Colburn LLP

(57) ABSTRACT

A photodetector includes a substrate, a graphene layer disposed on the substrate, a first electrode disposed on the graphene layer, and a second electrode disposed on the graphene layer, where the first and second electrodes are spaced apart from each other, and where each of the first and second electrodes comprises a complex transparent electrode. The complex transparent electrode of the first electrode may have a different composition from the complex transparent electrode of the second electrode.

23 Claims, 7 Drawing Sheets

GRAPHENE-BASED PHOTODETECTOR INCLUDING COMPLEX TRANSPARENT ELECTRODE, METHOD OF MANUFACTURING THE SAME, AND DEVICE INCLUDING THE SAME

CROSS-REFERENCE TO RELATED APPLICATIONS

This application claims priority to Korean Patent Application No. 10-2011-0121729, filed on Nov. 21, 2011, and all the benefits accruing therefrom under 35 U.S.C. §119, the content of which in its entirety is herein incorporated by reference.

BACKGROUND

1. Field

The present disclosure relates to graphene-based optical devices, and more particularly, to a graphene-based photodetector including a complex transparent electrode, a method of manufacturing the graphene-based photodetector, and a device including the graphene-based photodetector.

2. Description of the Related Art

Photodetectors are devices that generate electrical signals by receiving light and detecting the intensity of light, and are widely used in optical communication networks, precision measuring equipment, and the like. Recent communication networks, that is, the fourth generation of communication networks, generally operate at terahertz speeds such that high capacity data including moving images may be substantially rapidly processed. Thus, components used in communication networks have been improved to have a structure for high speed and high capacity processing.

In graphene, the effective mass of electrons and holes are close to zero at the Dirac point. Accordingly, theoretically, carriers may move at $\frac{1}{300}$ of light speed in graphene. And thus, graphene has higher mobility than materials known previously. In addition, the energy bandgap of graphene is about zero (0) electron volt (eV) in the Dirac point. Thus, graphene may absorb light substantially in an entire wavelength band, and thus, may allow broad band transmission. As a result, a photodetector including graphene may transmit high capacity data at high speed.

Conventional photodetectors have an asymmetrical structure in which an energy band is asymmetric due to two different metal electrodes that are used for measuring photocurrent. Due to this energy band structure, a photocurrent may be increased. However, energy conversion efficiency is substantially low in a conventional photodetector including graphene, and thus, the intensity of a detection signal may be substantially low.

SUMMARY

Provided are graphene-based photodetectors including a complex transparent electrode, which increases photocurrent based on interface expansion.

Provided are methods of manufacturing the graphene-based photodetectors.

Provided are devices including the graphene-based photodetectors.

Additional aspects will be set forth in part in the description which follows and, in part, will be apparent from the description, or may be learned by practice of the presented embodiments.

According to an embodiment of the invention, a photodetector includes: a substrate; a graphene layer disposed on the substrate; a first electrode disposed on the graphene layer, and a second electrode disposed on the graphene layer, where the first and second electrodes are spaced apart from each other, where each of the first and second electrodes includes a complex transparent electrode.

In an embodiment, the complex transparent electrode of the first electrode may have a different composition from the complex transparent electrode of the second electrode.

In an embodiment, the complex transparent electrode of the first electrode may include a first transparent metal electrode and a transparent electrode, which are sequentially stacked therein.

In an embodiment, the complex transparent electrode of the second electrode may include a second transparent metal electrode and a transparent electrode, which are sequentially stacked therein.

In an embodiment, the substrate may have one of a single layer structure and a multi-layer structure.

In an embodiment, the substrate may be flexible.

In an embodiment, the complex transparent electrode may include a metal electrode having a thickness less than about 20 nanometers (nm).

In an embodiment, the complex transparent electrode may be a transparent conductive oxide ("TCO") electrode, a carbon nanotube ("CNT") electrode, or a graphene electrode. In an embodiment, the TCO electrode may be an ITO electrode.

In an embodiment, an entire bottom surface of each of the first and second electrodes may contact the graphene layer.

According to another embodiment of the invention, a method of manufacturing a photodetector includes: providing a graphene layer on a substrate; providing a first electrode on the graphene layer; and providing a second electrode apart from the first electrode on the graphene layer, where each of the first and second electrodes include a complex transparent electrode.

In an embodiment, the providing the complex transparent electrode of the first electrode may include: providing a first metal electrode which allows transmission of light therethrough to the graphene layer; providing a transparent electrode on the first metal electrode; and patterning the transparent electrode and the first metal electrode.

In an embodiment, the providing the complex transparent electrode of the second electrode may include: providing a second metal electrode which allows transmission of light therethrough to the graphene layer; providing a transparent electrode on the second metal electrode; and patterning the transparent electrode and the second metal electrode.

In an embodiment, the first metal electrode may have a thickness less than about 20 nm.

In an embodiment, the second metal electrode may have a thickness less than about 20 nm.

In an embodiment, the first metal electrode may include at least one selected from palladium (Pd), titanium (Ti), aluminum (Al), gold (Au), silver (Ag), platinum (Pt), chromium (Cr), nickel (Ni), cobalt (Co) and copper (Cu).

In an embodiment, the second metal electrode may include at least one selected from Pd, Ti, Al, Au, Ag, Pt, Cr, Ni, Co and Cu.

In an embodiment, an entire bottom surface of each of the first and second electrodes may contact the graphene layer.

According to another embodiment of the invention, an optical device includes a photo device, where the photo device may be a photodetector including: a substrate; a graphene layer disposed on the substrate; a first electrode disposed on the graphene layer, and a second electrode disposed on the graphene layer, where the first and second electrodes are spaced apart from each other, where each of the first and second electrodes includes a complex transparent electrode.

In an embodiment, the optical device may be a camera.

As stated above, one or more embodiment of a photodetector according to the invention includes an electrode including a lower metal electrode and an upper transparent electrode, which are sequentially stacked. The lower metal electrode may have a thickness that allows transmission of light therethrough. Thus, the electrode including the lower metal electrode and the upper transparent electrode may transmit light. In such an embodiment, light is incident on a graphene layer through an area of the electrode contacting the graphene layer, and thus, a photocurrent is generated from the graphene layer. In such an embodiment, a photocurrent generated from a portion of the graphene layer that overlaps the electrode is added to a photocurrent generated in an interface between the electrode and a portion of the graphene layer around the electrode, that is, an interface where the electrode contacts the graphene layer around the electrode. Accordingly, a total photocurrent of an embodiment of the photodetector according to the invention is greater than a photocurrent of a conventional photodetector in which the photocurrent is generated only at the interface. In such an embodiment, the lower metal electrode has an asymmetrical structure such that the photocurrent generated from the graphene layer may further increase. In such an embodiment, a flexible photodetector may be realized where the substrate is flexible.

BRIEF DESCRIPTION OF THE DRAWINGS

These and/or other features will become apparent and more readily appreciated from the following description of the embodiments, taken in conjunction with the accompanying drawings in which.

DETAILED DESCRIPTION

Figure 1:
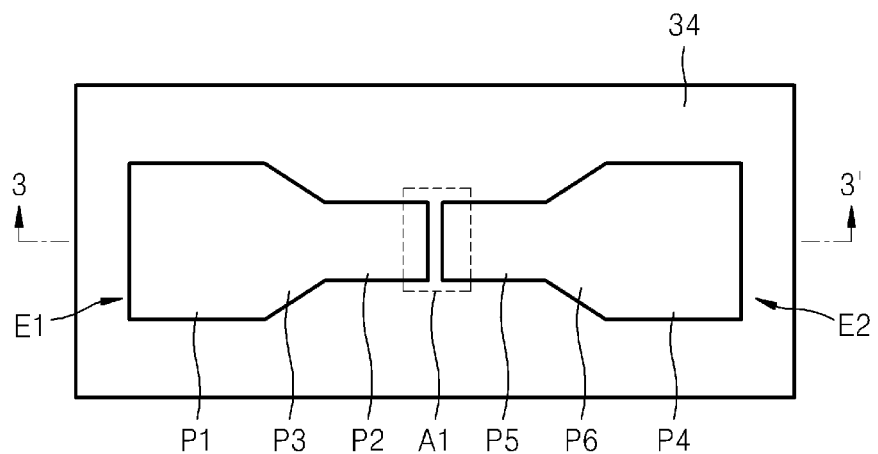
FIG. 1 is a plan view of an embodiment of a photodetector according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, embodiments of the invention will be described in further detail with reference to the accompanying drawings.

FIG. 1 is a plan view of an embodiment of a photodetector according to the invention.

Referring to FIG. 1, an embodiment of a photodetector includes a graphene layer 34. In such an embodiment, a first electrode E1 and a second electrode E2 are disposed on the graphene layer 34. In an embodiment, the first and second electrodes E1 and E2 are spaced apart from each other. The first electrode E1 has first to third portions P1 to P3 having different widths. The width of the first portion P1 is the widest, and the width of the second portion P2 is the narrowest. The third portion P3 is a portion between the first portion P1 and the second portion P2. In a direction toward the second portion P2 from the first portion P1, a width of the third portion P3 decreases. In an embodiment, the second electrode E2 has fourth to sixth portions P4 to P6. The widths of the fourth to sixth portions P4 to P6 may be substantially equal to the widths of the first to third portions P1 to P3, respectively.

Figure 2:
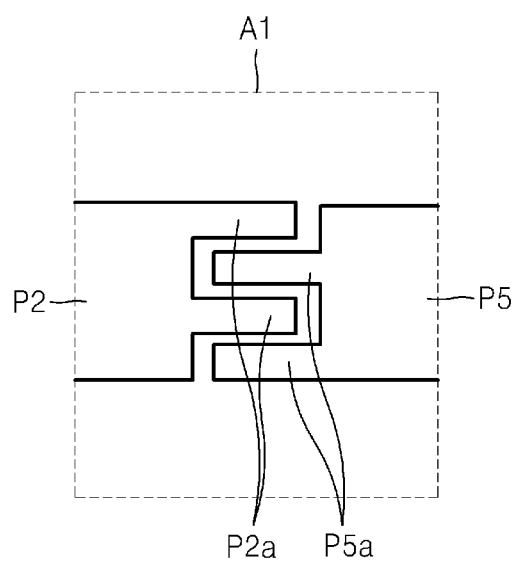
FIG. 2 is an enlarged view of a portion of an alternative embodiment, corresponding to the portion A1 of FIG. 1.

The second portion P2 of the first electrode E1 and the fifth portion P5 of the second electrode E2 are spaced apart from and facing each other. In an alternative embodiment, the interval between the second portion P2 and the fifth portion P5 may be narrower or wider than the interval in the embodiment shown in FIG. 1. In the second portion P2 and the fifth portion P5, parts facing each other may be variously modified. FIG. 2 shows an alternative embodiment, in which portions or edges of the second and fifth portions P2 and P5 facing each other are modified. As shown in FIG. 2, the area A1 of FIG. 1 may be modified. In FIG. 1, the area A1 includes the parts facing each other, e.g., the second portion P2 and fifth portion P5.

Referring to FIG. 2, the second portion P2 of the first electrode E1 has a plurality of first protrusion units P2a at an end thereof, facing the fifth portion P5. The plurality of first protrusion units P2a are spaced apart from each other. In one embodiment, for example, the plurality of first protrusion units P2a may include two first protrusion units P2a, as illustrated in FIG. 2, but not being limited thereto. In alternative embodiments, the second portion P2 may have only one protrusion unit or more than three protrusion units. The fifth portion P5 of the second electrode E2 has a plurality of second protrusion units P5a at an end thereof, facing the second portion P2. The plurality of second protrusion units P5a are spaced apart from each other. Configurations of protruding portions of the second protrusion units P5a may be substantially the same as the configurations of protruding portions of the first protrusion units P2a. In an embodiment, the first protrusion units P2a and the second protrusion units P5a are alternately disposed and spaced apart from each other. In an embodiment, intervals between the first protrusion units P2a and the second protrusion units P5a may be adjusted during a manufacturing process.

In an embodiment, the shapes of the parts facing each other in the second portion P2 of the first electrode E1 and the fifth portion P5 of the second electrode E2 are not limited to those illustrated in FIG. 2. In alternative embodiments, for example, the end of the second portion P2 of the first electrode E1 may be convex or concave, and the end of the fifth portion P5 of the second electrode E2, which faces the second portion P2, may be concave or convex. In an embodiment, the shapes of the parts facing each other in the second portion P2 and the fifth portion P5 may be variously modified.

Figure 3:
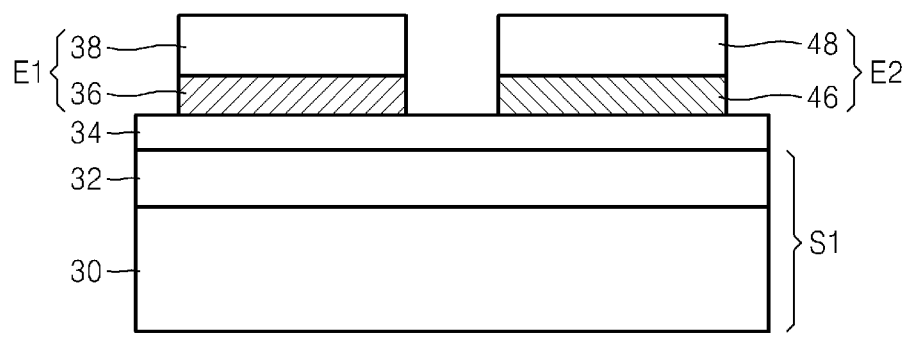
FIG. 3 is a cross-sectional view taken along line 3-3' of FIG. 1.

FIG. 3 is a cross-sectional view taken along line 3-3' of FIG. 1.

Referring to FIG. 3, a graphene layer 34 is provided on a substrate S1. In an embodiment, the graphene layer 34 may have a single layer structure or multi-layer structure. In an embodiment, the substrate S1 may a multi-layer structure including a silicon layer 30 and a silicon oxide film 32, which are sequentially stacked. The silicon layer 30 may be doped with impurities. In an embodiment, the substrate S1 may have a single layer structure including an insulation material layer, for example, a pure silicon substrate in which impurities are not doped. In an alternative embodiment, the substrate S1 has a single layer structure, the substrate S1 may be a flexible substrate including a polymer such as polymethyl methacrylate ("PMMA") or polyamide ("PI"), for example.

The first and second electrodes E1 and E2 are disposed on the graphene layer 34, and the first and second electrodes E1 and E2 are spaced apart from each other. Each of the first and second electrodes E1 and E2 is a complex transparent electrode. Entire bottom surfaces of the first and second electrodes E1 and E2 contact the graphene layer 34. In such an embodiment, interfaces between the first and second electrodes E1 and E2 and the graphene layer 34 may expand onto the entire bottom surfaces of the first and second electrodes E1 and E2. In such an embodiment, a photocurrent generated from a portion of the graphene layer that overlaps the electrode is added to a photocurrent generated in an interface between the electrode and a portion of the graphene layer around the electrode, that is, an interface where the electrode contacts the graphene layer around the electrode.

The first electrode E1 is the complex transparent electrode, and includes a first lower electrode 36 and a first upper electrode 38, which are sequentially stacked. In an embodiment, the first lower electrode 36 may be a metal film having a thickness in a range that allows transmission of light. The metal film may be a film including at least one selected from palladium (Pd), titanium (Ti), aluminum (Al), gold (Au), silver (Ag), platinum (Pt), chromium (Cr), nickel (Ni), cobalt (Co) and copper (Cu). In an alternative embodiment, the first lower electrode 36 may include a layer having a material that is attachable to the graphene layer 34 and having a thickness in a range that allows transmission of light. In an embodiment, the first electrode 36 is a palladium film or a titanium film, a thickness thereof may be less than about 20 nanometers (nm), for example, less than about 10 nm. In an embodiment, the first upper electrode 38 may be a transparent electrode, for example, a transparent conductive oxide ("TCO") electrode. In such an embodiment, the TCO electrode may be, for example, an indium tin oxide ("ITO") electrode. In an alternative embodiment, the first upper electrode 38 may include a transparent material. In one embodiment, for example, the first upper electrode 38 may include a material including carbon. In such an embodiment, the material including carbon may be, for example, carbon nanotube ("CNT") or graphene. In an embodiment, the thickness of the first upper electrode 38 may be about 200 nm.

The second electrode E2 is the complex transparent electrode, and includes a second lower electrode 46 and a second upper electrode 48, which are sequentially stacked. In an embodiment, the second lower electrode 46 may include a material substantially the same as the material of the first lower electrode 36, but not being limited thereto. In an alternative embodiment, the second lower electrode 46 may include a material different from the material of the first lower electrode 36. In an embodiment, the second upper electrode 48 may include a material substantially the same as the material of the first upper electrode 38, but not being limited thereto. In an alternative embodiment, the second upper electrode 48 may include a material different from the material of the first upper electrode 38.

Figure 4:
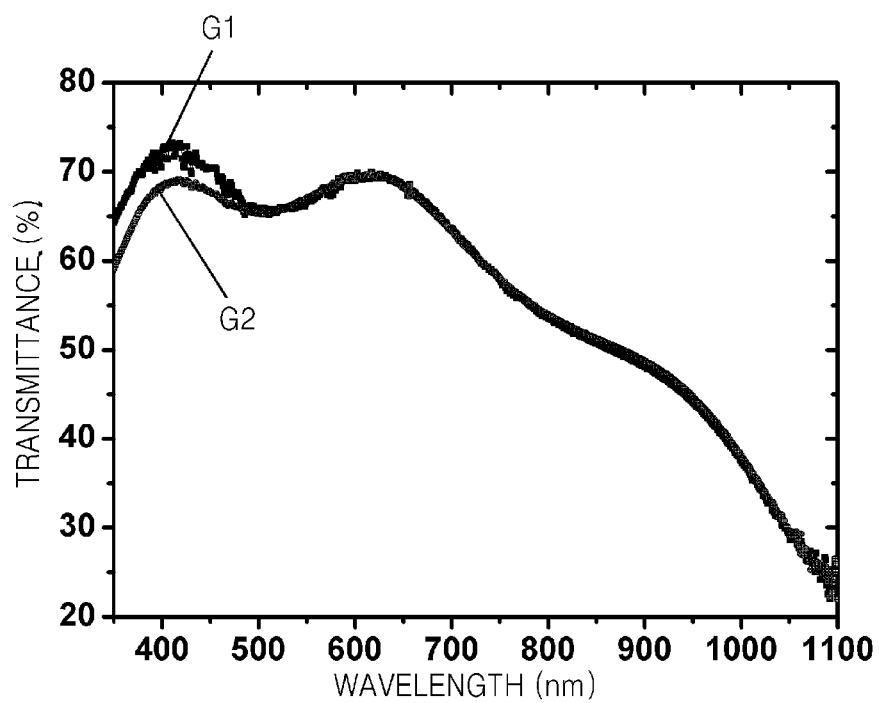
FIG. 4 is a graph illustrating transmittance (percent: %) versus wavelength (nanometer: nm), showing results of an exemplary experiment on light transmittance of first and second electrodes in FIG. 3.

FIG. 4 is a graph illustrating transmittance (percent: %) versus wavelength (nanometer: nm), showing results of an exemplary experiment regarding the light transmittance of the first and second electrodes E1 and E2, illustrated in FIG. 3. In such an experiment, the first electrode E1 is formed by sequentially stacking a palladium (Pd) electrode and an ITO electrode, and the second electrode E2 is formed by sequentially stacking a titanium (Ti) electrode and an ITO electrode. Thereafter, the first and second electrodes E1 and E2 are heat-treated for about five minutes at about 300° C. In the experiment, the thickness of each of the Pd electrode and the Ti electrode is about 10 nm, and the thickness of the ITO electrode is about 200 nm. In FIG. 4, the horizontal axis indicates the wavelength of light that is incident on the first and second electrodes E1 and E2, and the vertical axis indicates light transmittance with respect to the incident light. In FIG. 4, a first graph G1 illustrates the light transmittance of the first electrode E1, and a second graph G2 illustrates the light transmittance of the second electrode E2.

Referring to FIG. 4, the light transmittance of the first electrode E1 is about 66.1% when the wavelength of light is about 532 nm. The light transmittance of the second electrode E2 is about 66.2% when the wavelength of light is about 532 nm. As shown in FIG. 4, the first and second electrodes E1 and E2 may have sufficient transmittance with regard to the incident light, and the light transmittance of the first and second electrodes E1 and E2 may increase as a thickness of a metal electrode that is used as the first and second lower electrodes 36 and 46 decreases.

Figure 5A:
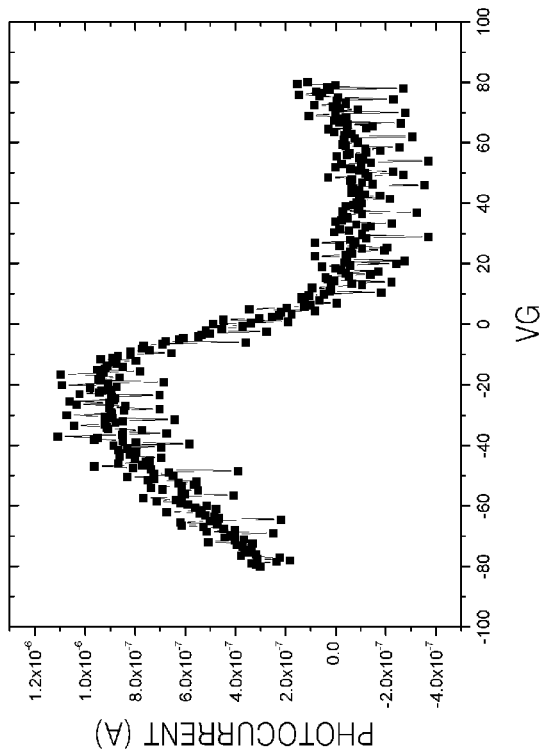
FIG. 5A is a graph illustrating photocurrent (ampere: A) versus gate voltage (volt: V) according to an exemplary experiment on a photocurrent of a photodetector including conventional electrodes that are not transparent electrodes.
Figure 5B:
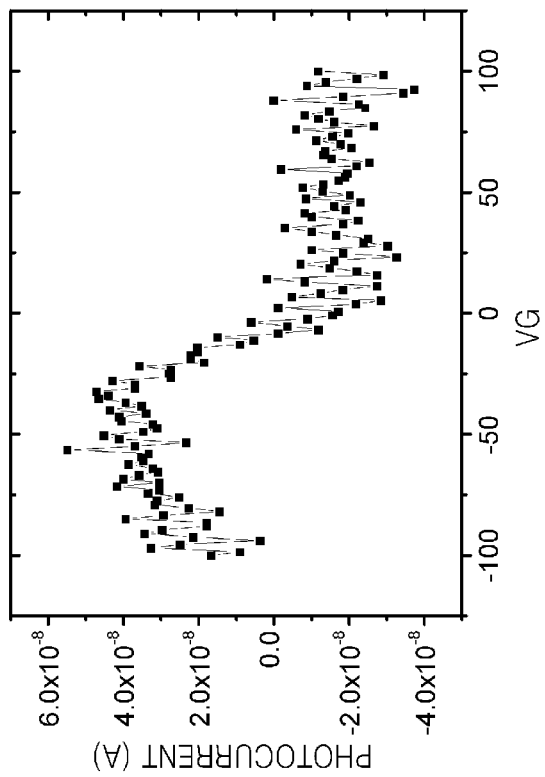
FIG. 5B is a graph illustrating photocurrent (A) versus gate voltage (V) according to an exemplary experiment on a photocurrent of a photodetector including the first and second electrodes illustrated in FIG. 3.

FIG. 5A is a graph illustrating photocurrent (ampere: A) versus gate voltage (volt: V) according to an exemplary experiment on a photocurrent of a photodetector including conventional electrodes that are not transparent electrodes, and FIG. 5B is a graph illustrating photocurrent (A) versus gate voltage (V) according to an exemplary experiment on a photocurrent of a photodetector including an embodiment of the first and second electrodes E1 and E2 according the invention. That is, FIG. 5A illustrates a result of a first experiment for the conventional electrodes having an asymmetrical structure, and FIG. 5B illustrates a result of a second experiment for an embodiment of the first and second electrodes E1 and E2 of the photodetector according to the invention.

In the second experiment regarding the photodetector including an embodiment of the first and second electrodes E1 and E2 according the invention, the first electrode E1 is provided by sequentially stacking a Pd electrode and an ITO electrode, and the second electrode E2 is provided by sequentially stacking a Ti electrode and an ITO electrode. In such an embodiment, the thickness of each of the Pd electrode and the Ti electrode is about 5 nm, and the thickness of the ITO electrode is about 60 nm. In the first experiment regarding the photodetector including the conventional electrodes, a conventional electrode corresponding to the first electrode E1 is provided with only a Pd electrode having a thickness that does not allow transmission of light, and a conventional electrode corresponding to the second electrode E2 is provided with only a Ti electrode having a thickness that does not allow transmission of light. In the first and second experiments, a voltage applied between two electrodes is maintained with about 0.2 V. In FIGS. 5A and 5B, the horizontal axis illustrates a gate voltage VG that is applied to graphene between the first and second electrodes E1 and E2, and the vertical axis illustrates a photocurrent.

Referring to FIG. 5A, in the first experiment on the conventional electrodes, the photocurrent has a maximum of about $5 \times 10^{-8}$ A. In the second experiment regarding the first and second electrodes E1 and E2 according the embodiment of the invention, as shown in FIG. 5B, the photocurrent has a maximum of about $1 \times 10^{-6}$ A, which is about 20 times greater than the maximum photocurrent of the conventional electrodes.

Hereinafter, an exemplary experiment showing that the increase of the photocurrent due to a contact interface between the first and second electrodes E1 and E2 and the graphene layer 34 will be described.

Figure 6:
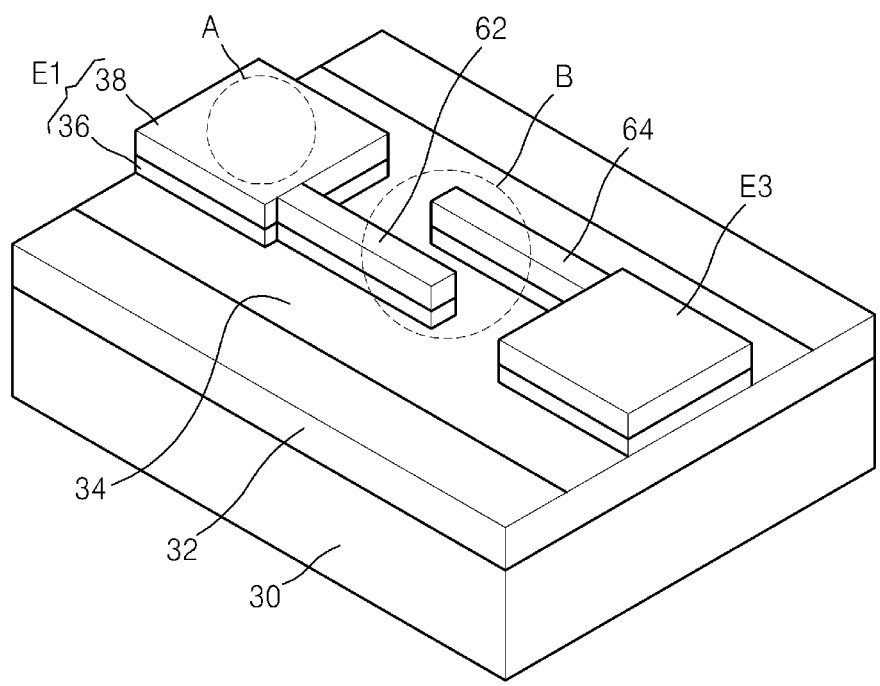
FIG. 6 is a perspective view of an alternative embodiment of a photodetector.

FIG. 6 is a perspective view of an alternative embodiment of a photodetector.

Referring to FIG. 6, a first electrode E1 is disposed on a graphene layer 34, and a third electrode E3 is disposed apart from the first electrode E1. A protrusion 62 of the first electrode E1 and a protrusion 64 of the third electrode E3 are disposed facing each other on the graphene layer 34. The protrusions 62 and 64 of the first and third electrodes E1 and E3 are disposed substantially parallel to and apart from each other. In such an embodiment, a portion of the graphene layer 34 between the protrusions 62 and 64 of the first and third electrodes E1 and E3 becomes a channel. The compositions of the first protrusion 62 are the same as the compositions of the first electrode E1. The composition of the protrusions 62 and 64 of the first and third electrodes E1 and E3 are substantially the same as each other. In an embodiment, the third electrode E3 and the protrusion 64 thereof may include a single metal electrode, and have a thickness that allows light to pass therethrough. In an embodiment, the third electrode E3 and the protrusion 64 thereof have the same composition as the conventional electrodes.

Figure 7:
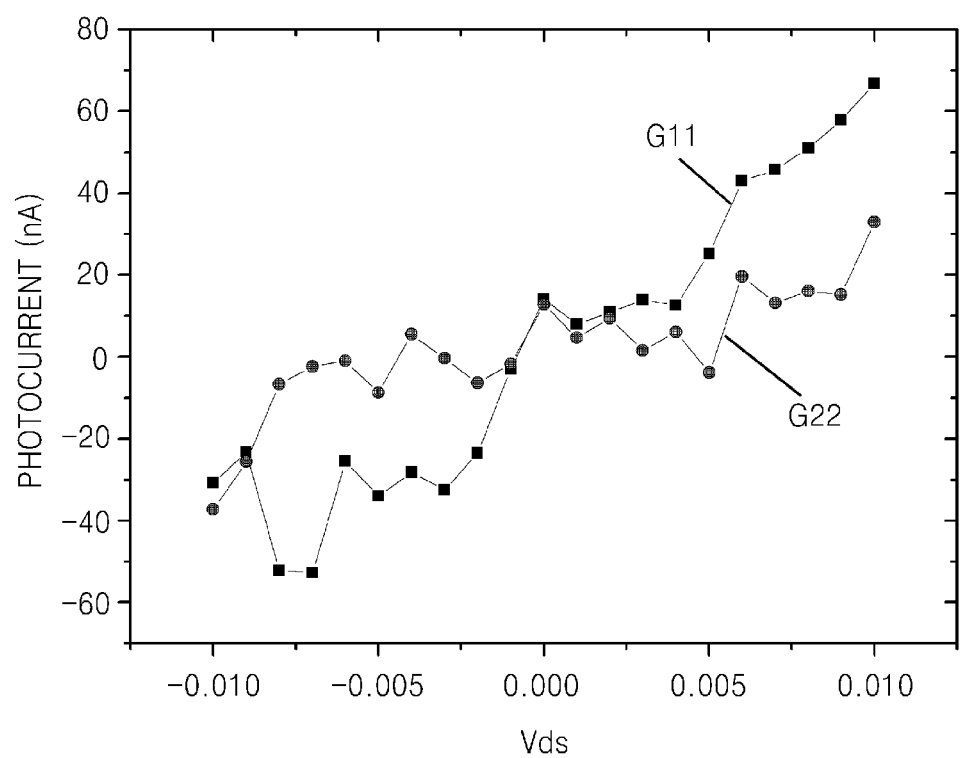
FIG. 7 is a graph illustrating photocurrent (nanoampere: nA) versus voltage (V) applied between first and third electrodes of FIG. 6, showing a photocurrent by radiating a laser beam on first and second areas A and B of the photodetector of FIG. 6.

In such an embodiment, a photocurrent may be measured by radiating a laser beam onto a first area A and a second area B of the photodetector of FIG. 6. The first area A is a portion of the first electrode E1. The second area B includes portions of the protrusions 62 and 64 of the first and third electrode E1 and E3 and a portion of the graphene layer 34 that is used as the channel. FIG. 7 is a graph illustrating photocurrent (nanoampere: nA) versus voltage (V) applied between first and third electrodes of FIG. 6, showing a photocurrent by radiating a laser beam onto the first and second areas A and B of FIG. 6.

In FIG. 7, the horizontal axis illustrates a voltage Vds applied between the first and third electrodes E1 and E3, and the vertical axis illustrates a photocurrent measured by radiating a laser beam. In FIG. 7, a first graph G11 illustrates a photocurrent measured in the first area A, and a second graph G22 illustrates a photocurrent measured in the second area B. As shown by the first graph G11 and the second graph G22, in a region where the applied voltage Vds is greater than about zero (0) V, a photocurrent measured in the first area A is greater than the photocurrent measured in the second area B.

Figure 8:
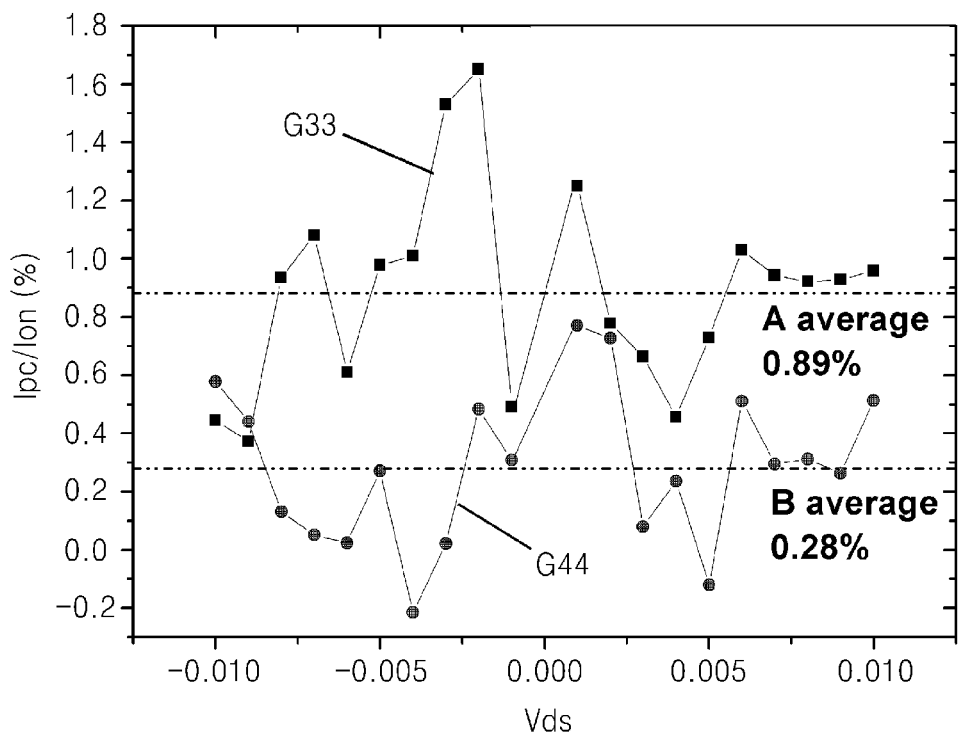
FIG. 8 is a graph illustrating ratio of a photocurrent of the first or second area A or B to the total current (percent: %) versus voltage (V) applied between first and third electrodes of FIG. 6, measured by radiating a laser beam onto the first and second areas A and B of the photodetector of FIG. 6.

FIG. 8 is a graph illustrating a ratio (percent: %) of a photocurrent Ipc of the first or second area A or B to the total current Ion versus voltage (V) applied between first and third electrodes of FIG. 6, measured by radiating a laser beam on the first and second areas A and B of the photodetector of FIG. 6. The photocurrent Ipc of the first or second area A or B is obtained by subtracting a current that flows in a state where a laser beam is not radiated from the total current Ion.

In FIG. 8, the horizontal axis illustrates a voltage Vds applied between the first and third electrodes E1 and E3 of FIG. 6, and the vertical axis illustrates a percent ratio of the photocurrent Ipc to the total current Ion. In FIG. 8, a third graph G33 illustrates a ratio of the photocurrent Ipc of the first area A to the total current Ion, and a fourth graph G44 illustrates a ratio of the photocurrent Ipc of the second area B of FIG. 6 to the total current Ion. In the third graph G33, the ratio of the photocurrent Ipc of the first area A of FIG. 6 to the total current Ion is about 0.89% on average. In the fourth graph G44, the ratio of the photocurrent Ipc of the second area B to the total current Ion is about 0.28% on average. In such an embodiment, the photocurrent of the first area A is about 3.18 times greater than the photocurrent of the second area B.

As shown in FIG. 8, a substantial portion of the photocurrent is generated in the contact interface between the graphene layer 34 and the first electrode E1. In addition, FIG. 8 shows that in an embodiment of the photodetector according to the invention, a substantial portion of the photocurrent is generated in the contact interface between the first and second electrodes E1 and E2 and the graphene layer 34. Accordingly, FIG. 8 indicates that the photocurrent generated in an embodiment of the photodetector according to the invention is greater than the photocurrent generated in a photodetector having conventional electrodes. In addition, FIG. 8 indicates that the energy conversion efficiency of an embodiment of the photodetector according to the invention is higher than the energy conversion efficiency of a photodetector having conventional electrodes.

Next, an embodiment of a method of manufacturing a photodetector according to the invention will be described with reference to FIGS. 9 and 10.

Figure 9:
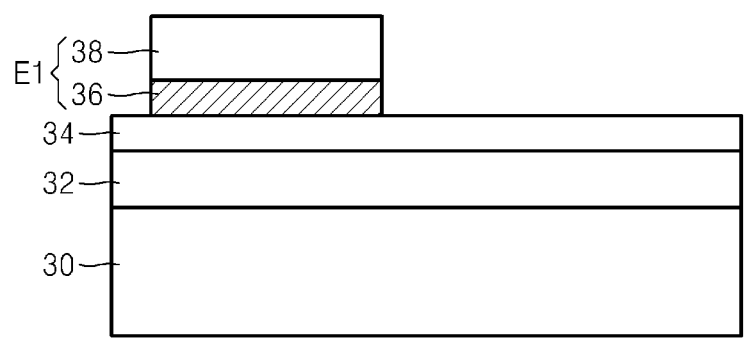
FIGS. 9 and 10 are cross-sectional views illustrating an embodiment of a method of manufacturing a photodetector according to the invention.
Figure 10:
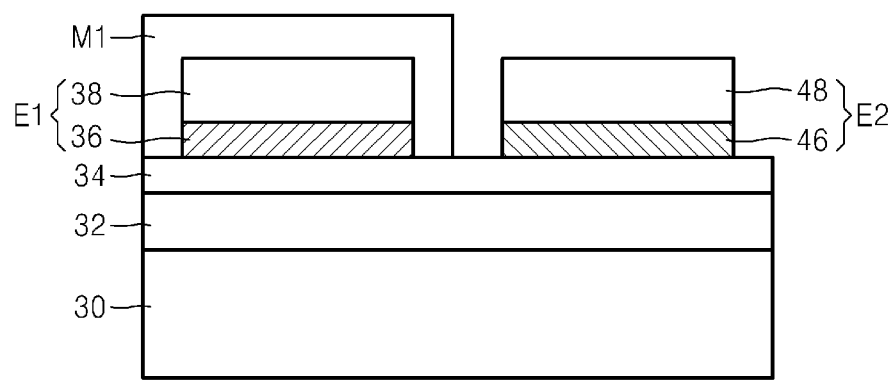

FIGS. 9 and 10 are cross-sectional views illustrating an embodiment of a method of manufacturing a photodetector according to the invention. Referring to FIG. 9, an insulation film 32 is provided on a substrate 30. A graphene layer 34 is provided on the insulation film 32. The graphene layer 34 may be provided by transferring graphene, which is formed using a micro mechanical exfoliation method, a chemical vapor deposition method, an epitaxy synthesis method, or an organic synthesis method, for example, on the insulation film 32. A first electrode E1 is provided by sequentially stacking a first lower electrode 36 and a first upper electrode 38 on a portion of the graphene layer 34. The first electrode E1 may be provided by sequentially disposing a first layer for the first lower electrode 36 and a second layer for the first upper electrode 38 on the upper surface of the graphene layer 34, by providing a mask (not shown) on the second layer for defining an area in which the first electrode E1 is to be provided, and by removing portions of the first and second layers around the mask. In such an embodiment, an entire bottom surface of the first electrode E1 contacts the graphene layer 34. Thereafter, the mask is removed.

Referring to FIG. 10, a second electrode E2 is provided on the graphene layer 34. The second electrode E2 is provided to be apart from the first electrode E1. The second electrode E2 is provided by sequentially disposed a first layer for the second lower electrode 46 and a second layer for the second upper electrode 48 on the upper surface of the graphene layer 34 and then etching the first and second layers using a mask. This process may be performed in the same manner as the process of providing the first lower electrode 36 and the first upper electrode 38 of the first electrode E1. When the second electrode E2 is provided, the first electrode E1 is protected by a mask M1. The mask M1 is provided before providing the second electrode E2, and the mask M1 is removed after the second electrode E2 is provided. An entire bottom surface of the second electrode E2 contacts the graphene layer 34.

Embodiments of the photodetector according to the invention may be used in various apparatuses, which include a photo device for generating electrical signals by receiving light and detecting the intensity of light. In an embodiment, the photodetector may be used instead of a photo device in a camera that operates based on automatic exposure or measurement of light.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A photodetector comprising:
   a substrate;
   a graphene layer disposed on the substrate;
   a first electrode disposed on the graphene layer; and
   a second electrode disposed on the graphene layer,
   wherein the first and second electrodes are spaced apart from each other, and
   wherein each of the first and second electrodes comprises a complex transparent electrode, and at least one of the first and second electrodes includes a transparent metal electrode and a transparent electrode, which are sequentially stacked therein.

2. The photodetector of claim 1, wherein the complex transparent electrode of the first electrode has a different composition from the complex transparent electrode of the second electrode.

3. The photodetector of claim 1, wherein the substrate has one of a single layer structure and a multi-layer structure.

4. The photodetector of claim 1, wherein the substrate is flexible.

5. The photodetector of claim 1, wherein the complex transparent electrode comprises a metal electrode having a thickness less than about 20 nanometers.

6. The photodetector of claim 1, wherein the complex transparent electrode of the first electrode comprises at least one of a transparent conductive oxide electrode, a carbon nanotube electrode and a graphene electrode.

7. The photodetector of claim 1, wherein
   an entire bottom surface of each of the first and second electrodes contacts the graphene layer.

8. The photodetector of claim 1, wherein the complex transparent electrode of the second electrode is at least one of a transparent conductive oxide electrode, a carbon nanotube electrode and a graphene electrode.

9. The photodetector of claim 1, wherein an entire bottom surface of each of the first and second electrodes contact the graphene layer.

10. A method of manufacturing a photodetector, the method comprising:
providing a graphene layer on a substrate;
providing a first electrode on the graphene layer; and
providing a second electrode apart from the first electrode, on the graphene layer,
wherein each of the first and second electrodes comprises a complex transparent electrode, and at least one of the first and second electrodes includes a transparent metal electrode and a transparent electrode, which are sequentially stacked therein.

11. The method of claim 10, wherein the providing the complex transparent electrode of the first electrode comprises:
providing a first metal electrode which allows transmission of light therethrough to the graphene layer;
providing a transparent electrode on the first metal electrode; and
patterning the transparent electrode and the first metal electrode.

12. The method of claim 10, wherein the providing the complex transparent electrode of the second electrode comprises:
providing a second metal electrode which allows transmission of light therethrough to the graphene layer;
providing a transparent electrode on the second metal electrode; and
patterning the transparent electrode and the second metal electrode.

13. The method of claim 11, wherein the first metal electrode has a thickness less than about 20 nanometers.

14. The method of claim 12, wherein the second metal electrode has a thickness less than about 20 nanometers.

15. The method of claim 11, wherein the first metal electrode comprises at least one material selected from palladium (Pd), titanium (Ti), aluminum (Al), gold (Au), silver (Ag), platinum (Pt), chromium (Cr), nickel (Ni), cobalt (Co) and copper (Cu).

16. The method of claim 12, wherein the second metal electrode comprises at least one material selected from palladium (Pd), titanium (Ti), aluminum (Al), gold (Au), silver (Ag), platinum (Pt), chromium (Cr), nickel (Ni), cobalt (Co) and copper (Cu).

17. The method of claim 11, wherein the transparent electrode comprises at least one of a transparent conductive oxide electrode, a carbon nanotube electrode and a graphene electrode.

18. The method of claim 10, wherein the substrate has one of a single layer structure and a multi-layer structure.

19. The method of claim 10, wherein the substrate is flexible.

20. The method of claim 10, wherein
an entire bottom surface of each of the first and second electrodes contact the graphene layer.

21. The method of claim 12, wherein the transparent electrode comprises at least one of a transparent conductive oxide electrode, a carbon nanotube electrode and a graphene electrode.

22. An optical device comprising a photo device, wherein the photo device comprises the photodetector of claim 1.

23. The optical device of claim 22, wherein the optical device is a camera.

* * * * *